United States Patent
Bohling et al.

(10) Patent No.: US 12,018,167 B2
(45) Date of Patent: *Jun. 25, 2024

(54) AQUEOUS COMPOSITION OF ORGANIC POLYMERIC MICROSPHERES, BINDER PARTICLES, AND ION EXCHANGE RESIN

(71) Applicant: Rohm and Haas Company, Collegeville, PA (US)

(72) Inventors: James C. Bohling, Lansdale, PA (US); Philip R. Harsh, Birdsboro, PA (US); Patrick E. Hartnett, Malvern, PA (US); Partha S. Majumdar, Harleysville, PA (US); Qing Zhang, Collegeville, PA (US)

(73) Assignee: Rohm and Haas Company, Collegeville, PA (US)

( * ) Notice: Subject to any disclaimer, the term of this patent is extended or adjusted under 35 U.S.C. 154(b) by 12 days.

This patent is subject to a terminal disclaimer.

(21) Appl. No.: 17/764,677

(22) PCT Filed: Oct. 7, 2020

(86) PCT No.: PCT/US2020/054543
§ 371 (c)(1),
(2) Date: Mar. 29, 2022

(87) PCT Pub. No.: WO2021/080772
PCT Pub. Date: Apr. 29, 2021

(65) Prior Publication Data
US 2022/0325124 A1    Oct. 13, 2022

Related U.S. Application Data

(60) Provisional application No. 62/923,797, filed on Oct. 21, 2019.

(51) Int. Cl.
| C09D 133/08 | (2006.01) |
| C08K 5/5445 | (2006.01) |
| C09D 5/02   | (2006.01) |
| C09D 5/16   | (2006.01) |
| C09D 7/40   | (2018.01) |
| C09D 7/42   | (2018.01) |

(52) U.S. Cl.
CPC ........... *C09D 133/08* (2013.01); *C09D 5/022* (2013.01); *C09D 5/1637* (2013.01); *C09D 5/1668* (2013.01); *C09D 7/42* (2018.01); *C09D 7/67* (2018.01); *C09D 7/68* (2018.01); *C09D 7/69* (2018.01); *C09D 7/70* (2018.01); *C08K 5/5445* (2021.01)

(58) Field of Classification Search
CPC ....... C09D 133/08; C09D 7/70; C08K 5/5445
See application file for complete search history.

(56) References Cited

U.S. PATENT DOCUMENTS

| 3,494,878 | A | 2/1970 | Harren et al. |
| 4,403,003 | A | 9/1983 | Backhouse |
| 5,527,619 | A | 6/1996 | Rokowski et al. |
| 5,922,777 | A | 7/1999 | Van Rheenen |
| 6,815,466 | B2 | 11/2004 | Van Rheenen |
| 7,768,602 | B2 | 8/2010 | LaFleur et al. |
| 7,829,626 | B2 | 11/2010 | Chiou et al. |
| 8,815,997 | B2 | 8/2014 | Zhang et al. |
| 8,900,669 | B2 | 12/2014 | LaFleur et al. |
| 2013/0052454 | A1 | 2/2013 | Donovan et al. |
| 2017/0058116 | A1* | 3/2017 | Ando .................. C09D 201/00 |
| 2018/0327562 | A1 | 11/2018 | Beshah et al. |

FOREIGN PATENT DOCUMENTS

| EP | 1316591 A2 | 6/2003 |
| EP | 3106526 A1 | 12/2016 |
| WO | 2020076744 A1 | 4/2020 |

* cited by examiner

*Primary Examiner* — Vickey Nerangis
(74) *Attorney, Agent, or Firm* — Reid S. Willis

(57) ABSTRACT

The present invention relates to a composition comprising an aqueous dispersion of a) polymer particles having a z-average particle size in the range of from 50 nm to 500 nm; b) anion exchange resin particles having a $D_{50}$ median particle size in the range of from 0.1 μm to 50 μm; and c) polymeric organic microspheres having a $D_{50}$ median particle size in the range of from 1 μm to 20 μm, wherein the weight-to-weight ratio of polymer particles to microspheres is in the range of from 0.5:1 to 20:1. The composition of the present invention is useful for paint compositions that form matte finishes with an excellent balance of stain blocking and stain removal properties.

7 Claims, No Drawings

AQUEOUS COMPOSITION OF ORGANIC POLYMERIC MICROSPHERES, BINDER PARTICLES, AND ION EXCHANGE RESIN

BACKGROUND OF THE INVENTION

The present invention relates to a composition comprising non-film-forming organic polymeric microspheres, film-forming binder, and ion exchange resin particles in an aqueous medium. The composition of the present invention is useful for providing a balance of stain removal and stain blocking properties for coatings arising from the application of the composition onto a substrate.

Stain blocking and stain removal are two key properties for coatings arising from architectural paints. Unfortunately, coatings arising from matte (flat) paints, which have a measured gloss of less than 10 gloss units at an 85° specular reflection angle, suffer from reduced durability and resistance properties as a result of the relatively high pigment volume concentration (PVC) contribution of inorganic extenders in these paints; consequently, the combination of acceptable stain blocking and stain removal is harder to achieve for these matte paints.

Moreover, stain resistance and stain blocking are orthogonal properties; that is to say, an improvement in one invariably results in an attenuation of the other. Accordingly, it would be an advantage in the field of low sheen paints to find a way to achieve improved stain blocking, without significantly compromising stain removal.

SUMMARY OF THE INVENTION

The present invention addresses a need in the art by providing a composition comprising an aqueous dispersion of a) from 5 to 50 weight percent, based on the weight of the composition, of polymer particles having a z-average particle size in the range of from 50 nm to 500 nm; b) from 0.01 to 7 weight percent, based on the weight the polymer particles, of anion exchange resin particles having a $D_{50}$ median particle size in the range of from 0.1 μm to 50 μm; and c) non-film-forming polymeric organic microspheres having a $D_{50}$ median particle size in the range of from 1 μm to 20 μm, wherein the weight-to-weight ratio of polymer particles to microspheres is in the range of from 0.5:1 to 20:1. The composition of the present invention is useful for paint compositions that form matte finishes with an excellent balance of stain blocking and stain removal properties.

DETAILED DESCRIPTION OF THE INVENTION

The present invention is a composition comprising an aqueous dispersion of a) from 5 to 50 weight percent, based on the weight of the composition, of polymer particles having a z-average particle size in the range of from 50 nm to 500 nm; b) from 0.01 to 7 weight percent, based on the weight the polymer particles, of anion exchange resin particles having a $D_{50}$ median particle size in the range of from 0.1 μm to 50 μm; and c) non-film-forming polymeric organic microspheres having a $D_{50}$ median particle size in the range of from 1 μm to 20 μm, wherein the weight-to-weight ratio of polymer particles to microspheres is in the range of from 0.5:1 to 20:1.

The polymer particles are preferably acrylic based, meaning these polymer particles comprise at least 30 weight percent, based on the weight of the polymer particles, of structural units of one or more methacrylate monomers such as methyl methacrylate and ethyl methacrylate, and/or one or more acrylate monomers such as methyl acrylate, ethyl acrylate, butyl acrylate, 2-propylheptyl acrylate, and 2-ethylhexyl acrylate. The acrylic-based polymers preferably further comprise from 0.1 weight percent to 10, more preferably to 5 weight percent structural units of an ethylenically unsaturated carboxylic acid monomer such as methacrylic acid, acrylic acid, or itaconic acid, or salts thereof, or from 0.1 to 5 weight percent structural units of a phosphorus acid monomer such as phosphoethyl methacrylate or a salt thereof. The acrylic-based polymer preferably comprise structural units of methacrylic acid or acrylic acid.

The polymer particles may also include structural units of other non-acrylate or methacrylate monomers such as styrene and vinyl acetate. The polymer particles are preferably film-forming below room temperature; and preferably have a calculated $T_g$ by the Fox equation of <20° C., more preferably <15° C.

The term "structural unit" is used herein to describe the remnant of the recited monomer after polymerization. For example, a structural unit of methyl methacrylate is as illustrated:

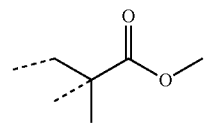

Structural Unit of Methyl Methacrylate where the dotted lines represent the points of attachment of the structural unit to the polymer backbone.

The concentration of the polymer particles is preferably in the range of from 10 weight percent, to preferably 40 weight percent, based on the weight of the composition. Preferably, the z-average particle size of the polymer particles is in the range of from 100 nm to 300 nm, more preferably to 250 nm as measured by dynamic light scattering using a Brookhaven BI90 particle analyzer or a comparable dynamic light scattering instrument.

The polymeric organic microspheres preferably comprise a low $T_g$ first stage polymer (≤20° C., preferably <10° C., and more preferably <0° C., as calculated by the Fox equation) that is preferably crosslinked to provide resiliency and no diffusion to the substrate; and a high $T_g$ second stage (≥30° C., preferably greater than 50° C., as calculated by the Fox equation) to provide microspheres that are not film-forming at room temperature. Preferably, at least 50, more preferably at least 70, and most preferably at least 90 weight percent of the preferably crosslinked first stage comprises structural units of I) methyl acrylate, butyl acrylate, or ethyl acrylate or a combination thereof; and II) a multiethylenically unsaturated nonionic monomer, exemplified hereinbelow, at a I:II w/w ratio in the range of from 99.5:0.5 to 90:10; preferably, structural units of methyl methacrylate comprises at least 60, more preferably at least 80, and most preferably at least 90 weight percent of the second stage.

The polymeric organic microspheres preferably have an average particle size (technically, a median weight average particle size, $D_{50}$) in the range of from 2 μm, preferably from 4 μm, to 20 μm, preferably 15 μm, as measured by Disc Centrifuge Photosedimentometry as described hereinbelow. Aqueous dispersions of microspheres can be prepared in a variety of ways, including those described in US Pat. Pub.

2013/0052454; U.S. Pat. Nos. 4,403,003; 7,768,602; and 7,829,626. The weight-to-weight ratio of the polymer particles to microspheres, preferably crosslinked microspheres, is preferably in the range of from 1:1, preferably from 1.3:1, and more preferably from 1.5:1, to preferably 15:1, more preferably to 10:1, more preferably to 5:1, and most preferably to 3:1.

In a preferred method of preparing an aqueous dispersion of polymeric organic crosslinked multistage microspheres (Preferred Method A), an aqueous dispersion of first microspheres comprising structural units of a first monoethylenically unsaturated nonionic monomer is contacted under polymerization conditions with first stage monomers comprising, based on the weight of the first stage monomers, from a) 0.05 to 5 weight percent of a polymerizable organic phosphate or a salt thereof; and b) from 70 to 99.95 weight percent of a second monoethylenically unsaturated nonionic monomer, to grow out the first microspheres to form an aqueous dispersion of organic phosphate functionalized second microspheres, wherein the first microspheres have a particle size in the range of from 1 µm to 15 µm and the second microspheres have a particle size in the range of from 1.1 µm and 20 µm; and wherein the polymerizable organic phosphate is represented by the structure of Formula I:

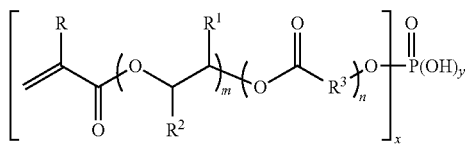

or a salt thereof; wherein R is H or $CH_3$, wherein $R^1$ and $R^2$ are each independently H or $CH_3$, with the proviso that the $CR^2CR^1$ groups are not $C(CH_3)C(CH_3)$ groups; each $R^3$ is independently linear or branched $C_2$-$C_6$ alkylene; m is from 1 to 10 and n is from 0 to 5, with the proviso that when m is 1, n is 1 to 5; x is 1 or 2; and y is 1 or 2; and x+y=3. The resultant microspheres prepared by this method are functionalized preferably with from 0.05 to 5 weight percent, based on the weight of the microspheres, of structural units of Formula I or a salt thereof.

When n is 0, x is 1, and y is 2, the polymerizable organic phosphate or salt thereof is represented by the structure of Formula II:

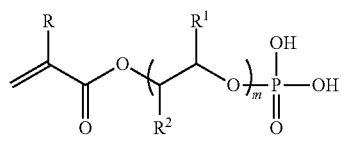

Preferably, one of $R^1$ and $R^2$ is H, and the other of $R^1$ and $R^2$ is $CH_3$; more preferably, each $R^2$ is H and each $R^1$ is $CH_3$; m is preferably from 3, and more preferably from 4; to preferably to 8, and more preferably to 7. Sipomer PAM-100, Sipomer PAM-200 and Sipomer PAM-600 phosphate esters are examples of commercially available compounds within the scope of the compound of Formula II.

In another aspect, where n is 1; m is 1; R is $CH_3$; $R^1$ and $R^2$ are each H; $R^3$—$(CH_2)_5$—; x is 1 or 2; y is 1 or 2; and x+y=3, the polymerizable organic phosphate or salt thereof is represented by the Structure of Formula III:

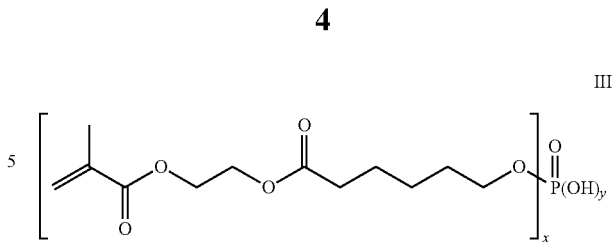

A commercially available compound within the scope of Formula III is Kayamer PM-21 phosphate ester.

In this method, the first microspheres preferably comprise from 90 to 99.9 weight percent structural units of a monoethylenically unsaturated nonionic monomer, examples of which include acrylates such as methyl acrylate, ethyl acrylate, butyl acrylate, and 2-ethylhexyl acrylate; methacrylates such as methyl methacrylate, n-butyl methacrylate, t-butyl methacrylate, hydroxyethyl methacrylate, hydroxypropyl methacrylate, acetoacetoxyethyl methacrylate, and ureido methacrylate; acrylonitrile; acrylamides such as acrylamide and diacetone acrylamide; styrene; and vinyl esters such as vinyl acetate. Although it is possible for the first microspheres to include structural units of carboxylic acid monomers such as methacrylic acid or acrylic acid, it is preferred that the first microspheres comprise less than 5, more preferably less than 3, and most preferably less than 1 weight percent structural units of a carboxylic acid monomer, based on the weight of the microspheres. The first microspheres more preferably comprise structural units of acrylates or methacrylates or combinations of acrylates and methacrylates.

The first microspheres are advantageously prepared from an aqueous dispersion of an oligomeric seed having a weight average molecular weight ($M_w$) in the range of from 800, preferably from 1000 g/mol to 20,000, preferably to 10,000 and most preferably to 5000 g/mol as determined by size exclusion chromatography using polystyrene standards as described herein. The oligomeric seed has an average diameter in the range of from 200 nm, more preferably from 400 nm, and most preferably from 600 nm, to 8000 nm, preferably to 5000 nm, more preferably to 1500 nm, and most preferably to 1000 nm, as determined by disc centrifuge DCP, as described herein. The oligomeric seed contains a structural unit of a chain transfer agent such as an alkyl mercaptan, examples of which include n-dodecyl mercaptan, 1-hexanethiol, 1-octane thiol, and 2-butyl mercaptan.

An aqueous dispersion of the oligomeric seed and a hydrophobic initiator are advantageously contacted with a first monoethylenically unsaturated monomer; alternatively, monomer can be swollen into the oligomeric seed, followed by addition of the hydrophobic initiator. The hydrophobic initiator is preferably added in the form of an aqueous dispersion. As used herein, a hydrophobic initiator refers to an initiator having a water solubility in the range of from 5 ppm, preferably from 10 ppm, to 10,000, preferably to 1000, and more preferably to 100 ppm. Examples of suitable hydrophobic initiators include such as t-amyl peroxy-2-ethylhexanoate (water solubility=17.6 mg/L at 20° C.) or t-butyl peroxy-2-ethylhexanoate (water solubility=46 mg/L at 20° C.). The extent of swelling (seed growth) can be controlled by the ratio of the monomer to the seed. Examples of suitable monoethylenically unsaturated nonionic monomers include acrylates such as ethyl acrylate, butyl acrylate, and 2-ethylhexyl acrylate; methacrylates such as methyl methacrylate, n-butyl methacrylate, t-butyl methacrylate, hydroxyethyl methacrylate, hydroxypropyl methacrylate, acetoacetoxyethyl methacrylate, and ureido methacrylate; acrylonitrile; acrylamides such as acrylamide and diacetone acrylamide; styrene; and vinyl esters such as vinyl acetate.

In another preferred method of preparing an aqueous dispersion of polymeric multistage crosslinked microspheres (Preferred Method B), the aqueous dispersion of first microspheres (prepared as described in Preferred Method A) are contacted with the first stage monomer comprising from 70 to 100 weight percent of the second monoethylenically unsaturated nonionic monomer to grow out the first microspheres to form an aqueous dispersion of second microspheres, as described hereinabove, except that the polymerization is carried out in the presence of a nonionic polyalkylene oxide of a distyryl or tristyryl phenol or an anionic polyalkylene oxide salt of a distyryl or tristyryl phenol. The nonionic polyalkylene oxide or anionic polyalkylene oxide salt of a distyryl or tristyryl phenol is represented by the compound of Formula IV:

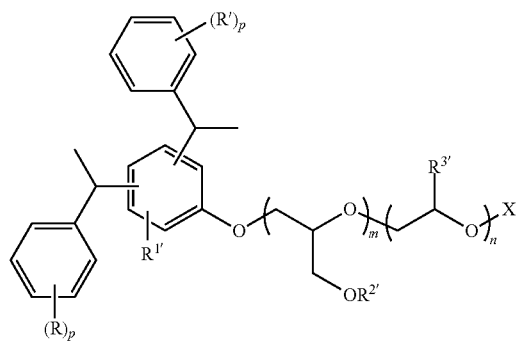

IV where each R' is independently $C_1$-$C_4$-alkyl; $R^{1'}$ is H, $CH_2CR=CH_2$, $CH=CHCH_3$, or 1-phenethyl-$(R')_p$; each $R^{2'}$ is independently H, allyl, methyl, acrylate, methacrylate, or —$CH_2CHR^3OX$; each $R^{3'}$ is independently H, methyl, or ethyl; m is 0 to 5; n is 6 to 40; p is 0, 1 or 2; and O—X is hydroxyl, methoxy, a sulfate or a phosphate. Preferably, $R^{1'}$ is 1-phenethyl-$(R')_n$; $R^{2'}$ is preferably H, $CH_3$, or allyl; m is preferably 0, 1, or 2; n is from 10 to 20; p is 0; and O—X is a sulfate or a phosphate. A more preferred polyethylene oxide salt of tristyryl phenol is represented by the compound of Formula V:

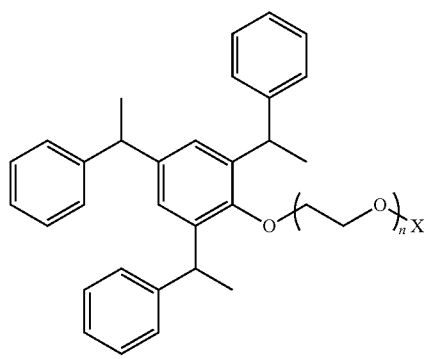

V where X is —$SO_3H$, —$SO_3Y$, —$H_2PO_3$, —$HPO_3Y$, or —$PO_3Y_2$, where Y is $Li^+$, $Na^+$, $K^+$, or $NH_4^+$. An example of a commercially available compound of Formula II is Solvay Soprophor 4D/384 ammonium salt of polyarylphenyl ether sulfate.

Another preferred ethylene oxide salt of distyryl phenol or tristyryl phenol, where m is non-zero, is represented by the compound of Formula VI.

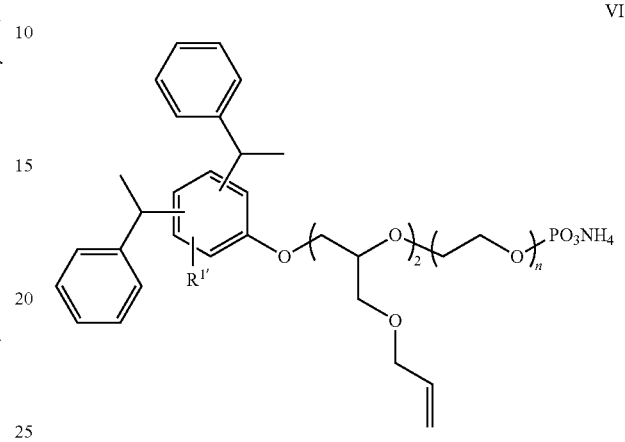

VI where n is preferably 12 to 18. A commercial example of the compound of Formula VI is E-Sperse RS-1684 reactive surfactant. Another example of a polyethylene oxide salt of a distyryl phenol is represented by the compound of Formula VII:

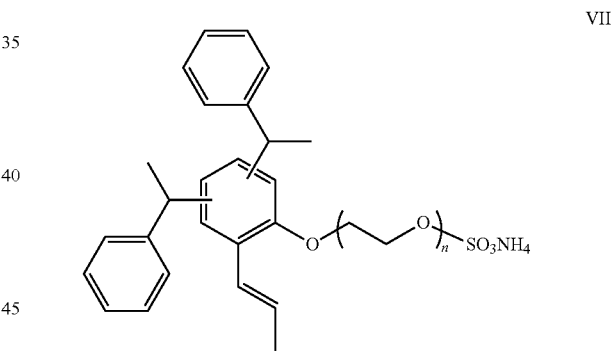

VII

A commercial example of the compound of Formula IV is Hitenol AR-1025 reactive surfactant.

The ion exchange resin particles are water-insoluble particles functionalized with basic groups that are capable of exchanging anions and are preferably water-insoluble porous particles. Examples of suitable basic groups include amines, quaternary ammonium salts, and aminophosphonic groups. Examples of anion exchange resins include polystyrene, polyacrylic, or phenol formaldehyde resins crosslinked with a suitable crosslinking agent such as divinyl benzene or allyl methacrylate. Commercial examples of anion exchange resins include DOWEX™ 1X2 Resin and AMBERLITE™ IRA-900 Cl Resin (Trademarks of The Dow Chemical Company or its Affiliates), both of which are polystyrene-divinyl benzene anion exchange resins functionalized with quaternary ammonium chloride.

The concentration of the anion exchange resin in the composition is preferably in the range of from 0.3 to 5, more preferably to 3 weight percent, based on the weight of the polymer particles. The anion exchange resin particles preferably have an average particle size in the range of from 0.75 μm, more preferably from 1 μm, and most preferably from 2 μm, to 20 μm, more preferably to 10 μm; as used herein average particle size for the anion exchange resin is the $D_{50}$ median particle size diameter as measured using a Mastersizer 3000 Particle Size Analyzer, or a comparable laser light scattering device.

The composition of the present invention may also include from 0.05, more preferably from 0.1, and most preferably from 0.3 weight percent, to 10, preferably to 5 weight percent, based on the weight of the polymer particles, of an aminosilane, which is a compound that contains a primary, a secondary, or a tertiary amino group, or a quaternary ammonium group separated by 2 to 6 carbon atoms, preferably 3 carbon atoms, from an Si—O group or a group that is hydrolyzable to an Si—O group (such as an SiH or SiCl group). More preferably, the aminosilane is illustrated by the following structure:

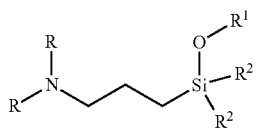

where each R is independently H, $C_1$-$C_3$-alkyl, phenyl, or 2-aminoethyl; $R^1$ is $C_1$-$C_3$-alkyl or $C(O)CH_3$; and each $R^2$ is independently H, $C_1$-$C_3$-alkyl, $C_1$-$C_3$-alkoxy, or O—C(O)CH$_3$.

Examples of suitable aminosilanes include N-methylaminopropyltrimethoxysilane, 2-aminoethyl-3-aminopropylmethyldimethoxysilane, aminopropyldimethylethoxysilane, N-2-aminoethyl-3-aminopropyltrimethoxysilane, 3-aminopropylmethyldimethoxysilane, 3-aminopropyltriethoxysilane, 3-aminopropyltrimethoxysilane, and N,N-dimethylaminopropyltrimethoxysilane.

The composition of the present invention is especially useful in providing an excellent balance of stain blocking and stain removal properties in matte paints. In another aspect, the composition further comprises a pigment such as $TiO_2$ particles, a rheology modifier and one or more additives selected from the group consisting of dispersants, surfactants, neutralizing agents, defoamers, extenders, opaque polymers, and coalescents.

EXAMPLES

Intermediate Comparative Example 1—Preparation of an Acrylic Latex

A monomer emulsion (ME1) was prepared from deionized water (670 g), Disponil FES 993 emulsifier (FES 993, 22.5 g), butyl acrylate (BA, 825 g), methyl methacrylate (MMA, 645 g), and glacial methacrylic acid (MAA, 30 g). To a 5-L 4-neck flask equipped with a mechanical stirrer, a reflux condenser, a thermocouple, and inlets for monomer emulsion and initiator solution was added deionized water (750 g) and FES 993 (5.77 g). The contents of the flask were stirred and heated to 82° C. A seed charge consisting of a portion of ME1 (76.3 g) was added to the flask followed by an initiator solution consisting of deionized water (10 g) and sodium persulfate (3.75 g). The seed charge and the initiator solution were rinsed into the flask with deionized water. Polymerization of the seed charge was monitored by a thermocouple and when the temperature of the reaction mixture peaked, the remainder of ME1 as well as a second initiator solution consisting of deionized water (200 g), sodium persulfate (0.75 g), and sodium carbonate (10.5 g) were fed into the reactor monotonically over 150 min, while the reactor temperature was controlled at 85° C. After completion of the feeds, the ME1 and initiator solution were rinsed into the flask using deionized water and the reactor was held at 85° C. for 10 min. The reactor was cooled to 80° C., and a solution of ferrous sulfate heptahydrate (0.02 g) and ethylenediaminetetraacetic acid tetrasodium salt (0.02 g) in deionized water (5 g) was added to the flask and rinsed with deionized water. Residual monomer in the reaction mixture was polymerized by feeding a solution of t-butyl hydroperoxide (t-BHP 4 g) in deionized water (20 g); a separate solution of isoascorbic acid (IAA, 2.2 g) in deionized water (20 g) was added to the flask over 20 min while cooling the reaction mixture to 55° C. After the feeds were complete, the reaction mixture was cooled to 30° C. and neutralized to pH 8 using ammonium hydroxide solution. Once neutralized, a solution consisting of KATHON™ LX 1400 Preservative (0.36 g), FES 993 (21.73 g), and deionized water (8.19 g) was added to the flask. The resulting latex was filtered to remove coagulum. The measured solids of the resulting latex was 45.4%.

Intermediate Comparative Example 2—Preparation of an Acrylic Latex With an Aminosilane The procedure of Comparative Intermediate Example 1 was followed except that 1 weight % 2-aminoethyl-3-aminopropyltrimethoxysilane (2.72 g, 1 weight percent based on latex solids) was added to a portion of the final latex (600 g).

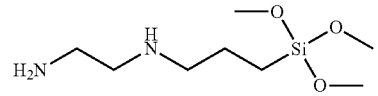

2-Aminoethyl-3-aminopropyltrimethoxysilane

Intermediate Example 1—Preparation of an Acrylic Latex With an Ion Exchange Resin The procedure of Intermediate Comparative Example 1 was followed except that 1.0% of DOWEX 1X2 Ion Exchange Resin, ground to a median particle size of 4-6 μm (as taught in U.S. Pat. No. 8,815,997 B2) was added to the final latex. The chloride form of the resin was used.

Intermediate Example 2—Preparation of an Acrylic Latex With an Ion Exchange Resin and an Amino Silane The procedure of Intermediate Comparative Example 2 was followed except that 1.0% of DOWEX™ 1X2 Ion Exchange Resin, ground to a median particle size of 4-6 μm (as taught in U.S. Pat. No. 8,815,997 B2) was added to the final latex. The chloride form of the resin was used.

Intermediate Example 3—Preparation of an Aqueous Dispersion of Microspheres

The microspheres were prepared substantially in accordance with US 2018/0327562, Example 5, and adjusted to 43.5% solids. Particle size was 8.4 μm as measured by DCP.

Comparative Paint Example 1— Preparation of a Matte Paint Formulation Without Ion Exchange Resin The acrylic emulsion (latex) of Intermediate Comparative Example 1 (402.55 g) and the Intermediate Example 3 acrylic microspheres (253.72 g) were mixed together in a 1-L container with overhead stirring for 2 min followed by slow addition of Kronos 4311 $TiO_2$ ($TiO_2$, 263.10 g). Mixing was continued for 5 min, after which time Texanol coalescent (Coalescent, 13.22 g) and BYK-022 defoamer (Defoamer, 0.28 g) were added slowly to the mixture. Mixing was continued for an additional 2 to 3 min, whereupon the stirring speed was increased; ACRYSOL™ RM-2020 NPR Rheology Modifier (A Trademark of The Dow Chemical Company or its Affiliates, RM-2020, 25.01 g) was then added slowly, followed by addition under high speed stirring of ACRYSOL™ RM-8W Rheology Modifier (RM-8W, 2.71 g) and water (51.60 g); mixing was continued for an additional 5 min. The final mixture was a pigmented, microsphere containing paint.

Table 1 illustrates Paint formulations for Comparative Paint Examples 1 and 2 (C. Paint Ex 1, C. Paint Ex 2) and Paint Examples 1 and 2 (Paint 1 and Paint 2).

TABLE 1

Paint Formulations

| Ingredient (g) | C. Paint Ex 1 | C. Paint Ex 2 | Paint 1 | Paint 2 |
| --- | --- | --- | --- | --- |
| Int. C. Ex 1 | 402.55 g | | | |
| Int. C. Ex 2 | | 398.64 g | | |
| Int. Ex 1 | | | 415.34 g | |
| Int. Ex 2 | | | | 412.55 g |
| Int. Ex 3 | 253.72 g | 253.68 g | 253.72 g | 253.58 g |
| $TiO_2$ | 263.10 g | 263.06 g | 263.11 g | 262.96 g |
| Texanol | 13.22 g | 13.22 g | 13.22 g | 13.21 g |
| Byk-022 | 0.28 g | 0.28 g | 0.28 g | 0.28 g |
| RM-2020 | 25.01 g | 25.01 g | 25.01 g | 25.00 g |
| RM-8W | 2.71 g | 2.71 g | 2.71 g | 2.71 g |
| Water | 51.60 g | 55.00 g | 40.08 g | 43.05 g |
| Total Wt. | 1012.18 g | 1011.58 g | 1013.47 g | 1013.33 g |

Marker Stain Blocking Test:

The formulations were evaluated for Marker Stain Blocking by the following method, adapted from ASTM D 7514-14:

A flat interior test paint was drawn down with a 75-μm (3-mil) Bird film applicator over white Leneta Penopac WB plain white chart and dried for 7 d at 25° C. and 50% relative humidity. Multiple marker stains (lipstick, purple crayon, coffee and blue marker) were applied to a dried film across the width of the film and the marker was allowed to dry for 4 d. To assess marker stain blocking, a drawdown of the test paint and the control paint were made side-by-side perpendicular to the marker stain using a 75-μm (3-mil) Bird film applicator, and the film was allowed to dry overnight; then a second coat was similarly applied using a 178-μm (7-mil) "U" shaped straddle bar film applicator, and then the film was allowed to dry overnight.

Marker stain blocking was measured using an X-Rite Spectrophotometer Model Ci7. This equipment was used to measure the color change of the unstained and stained area of the substrate which was covered by the paint coating as described above. The value used to express the degree of marker stain blocking is Delta E (ΔE), which is the total color difference represented by a factual sum of 'L', 'a', and 'b' values such that:

$$\Delta E = (\Delta L^2 + \Delta a^2 + \Delta b^2)^{1/2}$$

'L' is a measure of color intensity; L=100 is equivalent to white, and L=0 is equivalent to black; "a" is a measure of the red and green color hues, wherein positive equates to red and negative equates to green; "b" is a measure of yellow and blue color hues, wherein positive equates to yellow and negative equates to blue. When measuring ΔE of the test paints and controls, lower ΔE indicate better marker stain blocking performance Stain Removal Test:

The stain removal test was carried out in accordance with ASTM Method D4828:

Paints were drawn down on a Black Vinyl Chart (Leneta Form P121-10N) using a 7-mil Dow bar side-by-side with a control paint and allowed to dry for 7 d at a controlled temperature and humidity (72° F./50% RH). After 7 d, hydrophobic and hydrophilic stains were applied in a uniform fashion to all of the drawdowns.

Hydrophobic: #2 pencil, purple Crayola crayon, Papermate blue pen, red Crayola crayon, Covergirl lipstick #305.

Hydrophilic: black washable marker, French's mustard, Pure Java coffee, tea, and Carlo Rossi Burgundy wine.

The coffee, tea, and wine were applied to a ½"-piece of blotter paper to keep them from spreading. Stains remained in place for 2-3 h, at which time the blotter papers were removed and the mustard and ketchup were gently wiped away with a shurwipe. The panels were then washed on a Gardco Washablility and Wear Tester using a sponge loaded with 15 mL of water and 10 mL of Leneta standardized non-abrasive scrub medium (Item SC-1), which was placed into the boat equipped with a 100-g weight and run for 100 cycles. The drawdown was rinsed thoroughly and hung up to dry. The stain removal performance was rated from 1 to 5 with 5 the best performance, for each stain. The scores for each stain were added together to give an overall rating for stain removal. A higher rating score is better.

Tables 2 and 3 illustrate the stain blocking (as measured by total ΔE) and stain removal properties of the cumulative stains respectively. Lower total ΔE is better. Total ΔE refers to the sum of the ΔE's from lipstick, purple crayon, coffee, and blue marker.

TABLE 2

Stain blocking properties measured by ΔE (total).

| Description | ΔE (total) |
| --- | --- |
| C. Paint Ex 1 | 50.61 |
| C. Paint Ex 2 | 47.02 |
| Paint Ex 1 | 30.02 |
| Paint Ex 2 | 30.29 |

Table 2 illustrates a dramatically improved reduction in ΔE for paint compositions containing ion exchange resin or ion exchange resin and aminosilane.

TABLE 3

Stain Removal Properties of Coatings

| Paint Sample | Hydrophobic Stain Rating | Hydrophilic Stain Rating | Total Rating |
| --- | --- | --- | --- |
| C. Paint Ex 1 | 14 | 15 | 29 |
| C. Paint Ex 2 | 14 | 15 | 29 |
| Paint Ex 1 | 13 | 12 | 25 |
| Paint Ex 2 | 13 | 15 | 28 |

Table 3 shows that the total stain rating is not significantly adversely affected by the addition of ion exchange resin to the matte paint and even less so by the combination of ion exchange resin and aminosilane addition. Thus, an improvement in balance of overall stain removal and stain blocking is improved with the presence of ion exchange resin or a combination of ion exchange resin and aminosilane in matte paint formulations.

The invention claimed is:

1. A composition comprising an aqueous dispersion of a) from 5 to 50 weight percent, based on the weight of the composition, of polymer particles having a z-average particle size in the range of from 50 nm to 500 nm; b) from 0.01 to 7 weight percent, based on the weight the polymer particles, of anion exchange resin particles having a $D_{50}$ median particle size in the range of from 0.1 μm to 50 μm; c) non-film-forming polymeric organic microspheres having $D_{50}$ median particle size in the range of from 1 μm to 20 μm; and d) from 0.3 to 10 weight percent, based on the weight of the polymer particles, of an aminosilane represented by the following structure:

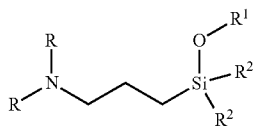

where each R is independently H, $C_1$-$C_3$-alkyl, or 2-aminoethyl; $R^1$ is $C_1$-$C_3$-alkyl; and each $R^2$ is independently H, $C_1$-$C_3$-alkyl, or $C_1$-$C_3$-alkoxy;

wherein the weight-to-weight ratio of polymer particles from component a) to microspheres from component c) is in the range of from 0.5:1 to 20:1.

2. The composition of claim 1 wherein the polymer particles are acrylic based polymer particles comprising structural units of a) methyl methacrylate; b) one or more nonionic monomers selected from the groups consisting of methyl acrylate, ethyl acrylate, butyl acrylate, 2-propylheptyl acrylate, and 2-ethylhexyl acrylate; and c) one or more anionic monomers or salts thereof selected from the group consisting of methacrylic acid, acrylic acid, itaconic acid, and phosphoethyl methacrylate.

3. The composition of claim 1 wherein the polymeric organic microspheres are crosslinked and functionalized with from 0.05 to 5 weight percent structural units of a polymerizable organic phosphate or a salt thereof as illustrated by the following structure I:

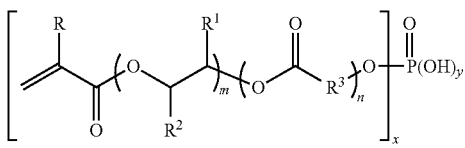

or a salt thereof; wherein R is H or $CH_3$, wherein $R^1$ and $R^2$ are each independently H or $CH_3$, with the proviso that the $CR^2CR^1$ groups are not $C(CH_3)C(CH_3)$ groups;

each $R^3$ is independently linear or branched $C_2$-$C_6$ alkylene; m is from 1 to 10 and n is from 0 to 5, with the proviso that when m is 1, n is 1 to 5; x is 1 or 2; and y is 1 or 2; and x+y=3.

4. The composition of claim 3 wherein polymerizable organic phosphate or salt thereof is represented by the structure of Formula II:

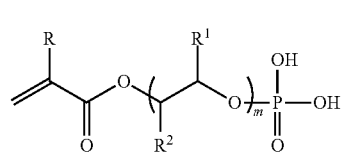

wherein each $R^2$ is H; each $R^1$ is $CH_3$; and m is from 3 to 8.

5. The composition of claim 4 wherein the concentration of the anion exchange resin particles is in the range of from 0.3 to 5 weight percent, based on the weight of the polymer particles; and the $D_{50}$ median particle size of the anion exchange resin particles is in the range of from 1 μm to 20 μm; wherein the weight-to-weight ratio of the polymer particles to microspheres is in the range of from 1:1 to 10:1; wherein the concentration of the aminosilane is in the range of from 0.3 to 5 weight percent, based on the weight of the polymer particles; and wherein the aminosilane is selected from the group consisting of N-methylaminopropyltrimethoxysilane, 2-aminoethyl-3-aminopropylmethyldimethoxysilane, aminopropyldimethylethoxysilane, N-2-aminoethyl-3-aminopropyltrimethoxysilane, 3-aminopropylmethyldimethoxysilane, 3-aminopropyltriethoxysilane, 3-aminopropyltrimethoxysilane, and N,N-dimethylaminopropyltrimethoxysilane.

6. The composition of claim 1 wherein the concentration of the anion exchange resin particles is in the range of from 0.3 to 5 weight percent, based on the weight of the polymer particles; and the $D_{50}$ median particle size of the anion exchange resin particles is in the range of from 1 μm to 20 μm; wherein the weight-to-weight ratio of the polymer particles to microspheres is in the range of from 1:1 to 10:1; wherein the concentration of the aminosilane is in the range of from 0.3 to 5 weight percent, based on the weight of the polymer particles; and wherein the aminosilane is selected from the group consisting of N-methylaminopropyltrimethoxysilane, 2-aminoethyl-3-aminopropylmethyldimethoxysilane, aminopropyldimethylethoxysilane, N-2-aminoethyl-3-aminopropyltrimethoxysilane, 3-aminopropylmethyldimethoxysilane, 3-aminopropyltriethoxysilane, 3-aminopropyltrimethoxysilane, and N, N-dimethylaminopropyltrimethoxysilane.

7. The composition of any of claims 1 which further comprises $TiO_2$ particles, a rheology modifier and one or more additives selected from the group consisting of dispersants, surfactants, neutralizing agents, defoamers, extenders, opaque polymers, and coalescents, wherein the composition is a matte paint composition.

* * * * *